US007490059B2

(12) United States Patent
Albee et al.

(10) Patent No.: US 7,490,059 B2
(45) Date of Patent: Feb. 10, 2009

(54) METHODS AND SYSTEMS FOR CONSOLIDATING FINANCIAL REPORTING INFORMATION

(75) Inventors: Steven Ladd Albee, Omaha, NE (US); Gary Francis Chladek, Bellevue, NE (US); Barbara C. Gaines, Omaha, NE (US); Gerald Frederick Gross, Omaha, NE (US); Sandra Sue Haugen, Papillion, NE (US); Brenda Lee Kann, Omaha, NE (US); Christina Marie Provost, Omaha, NE (US); Terry Lynne Royer, Neola, IA (US); Robert Alan Stier, Papillion, NE (US); Glen David Wordekemper, Omaha, NE (US)

(73) Assignee: First Data Corporation, Englewood, CO (US)

( * ) Notice: Subject to any disclaimer, the term of this patent is extended or adjusted under 35 U.S.C. 154(b) by 239 days.

(21) Appl. No.: 10/353,778

(22) Filed: Jan. 27, 2003

(65) Prior Publication Data
US 2004/0148239 A1 Jul. 29, 2004

(51) Int. Cl.
*G06Q 40/00* (2006.01)
(52) U.S. Cl. .............................. 705/35; 705/38; 705/39
(58) Field of Classification Search .................. 705/35, 705/38, 39; 707/10, 101, 102, 201, 204; 715/515, 522, 500.1, 516, 526, 530
See application file for complete search history.

(56) References Cited
U.S. PATENT DOCUMENTS

| 5,390,175 | A | * | 2/1995 | Hiller et al. ................. 370/398 |
| 5,684,965 | A | * | 11/1997 | Pickering ..................... 705/34 |
| 5,978,780 | A | * | 11/1999 | Watson ....................... 705/40 |
| 6,128,602 | A | * | 10/2000 | Northington et al. .......... 705/35 |
| 6,363,362 | B1 | * | 3/2002 | Burfield et al. ............... 705/40 |
| 6,421,711 | B1 | * | 7/2002 | Blumenau et al. ........... 709/213 |
| 6,513,019 | B2 | * | 1/2003 | Lewis .......................... 705/35 |
| 6,606,698 | B2 | * | 8/2003 | Fradette ...................... 711/209 |
| 6,639,975 | B1 | * | 10/2003 | O'Neal et al. .......... 379/112.01 |
| 2001/0052061 | A1 | * | 12/2001 | Fradette ...................... 711/202 |
| 2002/0026558 | A1 | * | 2/2002 | Reuter et al. ................ 711/114 |
| 2002/0049705 | A1 | * | 4/2002 | Haviv-Segal et al. ........... 707/1 |
| 2002/0069096 | A1 | * | 6/2002 | Lindoerfer et al. ............ 705/7 |
| 2002/0099644 | A1 | * | 7/2002 | Kemp et al. .................. 705/37 |

(Continued)

FOREIGN PATENT DOCUMENTS

WO WO 02/19229 A2 * 3/2002

OTHER PUBLICATIONS

Alpert Henry, Wheat First Union Adopts Banks's Assetment Account, Bank Investment Marketing, Feb. 1, 1999, p. 1.*

(Continued)

*Primary Examiner*—Jagdish N Patel
(74) *Attorney, Agent, or Firm*—Townsend and Townsend and Crew LLP (57) ABSTRACT

Methods and systems are provided for providing financial reporting information to a customer. Financial reporting information for a multiple distinct financial accounts is received at a host. The received financial reporting information is mapped onto a set of distinct financial account types. A consolidation of the mapped financial reporting information is determined according to a set of consolidation rules. The consolidated financial reporting information is then formatted according to a set of fulfillment rules for distribution to the customer.

23 Claims, 5 Drawing Sheets

U.S. PATENT DOCUMENTS

| | | | | |
|---|---|---|---|---|
| 2002/0133449 | A1* | 9/2002 | Segal et al. | 705/37 |
| 2003/0018558 | A1* | 1/2003 | Heffner et al. | 705/37 |
| 2003/0105687 | A1* | 6/2003 | Bross et al. | 705/31 |
| 2003/0200307 | A1* | 10/2003 | Raju et al. | 709/224 |
| 2003/0225607 | A1* | 12/2003 | Kopunovic et al. | 705/9 |
| 2005/0218213 | A1 | 10/2005 | Rasnake et al. | |

OTHER PUBLICATIONS

Web Page, "TS1 Processing System", at www.tsys.com/products/index.cfm?pageID=224, Printed Jun. 12, 2003.

Web Page, "TS2 Processing System", at www.tsys.com/products/index.cfm?pageID=225, Printed Jun. 12, 2003.

Web Page, "Commercial Card Processing", at www.tsys.com/products/index.cfm?pageID=271, Printed Jun. 12, 2003.

Web Page, "DST Output, Solutions & Capabilities: Communications Management", at www.output.net/docs/solutions/comm. mgt.html, Printed Jun. 4, 2003.

Web Page, "Products and Services", at www.csgsystems.com/content.cfm?Id=381 also 389,391,392,411,412,416,390,417,423,424,425,592, Printed Jun. 12, 2003.

Web Page, "Business Communication Services", at www.moore.com/wwwMooreWallace/ProductsServices/BCS/BCS.asp, Printed Jun. 12, 2003.

* cited by examiner

METHODS AND SYSTEMS FOR CONSOLIDATING FINANCIAL REPORTING INFORMATION

BACKGROUND OF THE INVENTION

This application relates generally to financial reporting information. More specifically, this application relates to methods and systems for consolidating financial reporting information.

Many businesses currently offer a diverse selection of products and/or services to their customers. This diversity may provide a number of advantages, such as allowing the businesses to promote that diversity and thereby attract greater numbers of customers, and to provide an enhanced level of service to those customers. These advantages sometimes come at a cost, however, because the diversity of products and services itself causes compartmentalization of tasks. This may require, for example, the performance of additional processes and tasks.

This may be illustrated, for example, with the case of reporting financial information to customers. In the case where the business is a financial institution, such as a bank, the diverse array of services offered may include, for example, savings- and checking-account services, trust-management services, mortgage services, loan services including car-loan and home-equity-loan services, credit-card services, etc. As part of each of the administration of each of these services, financial information for the service may be reported to the customer. Throughout a month, a customer may thus receive a variety of pieces of financial reporting information, all originating from services administered by the same financial institution. For example, the customer may one day receive a savings-account statement summarizing deposits, withdrawals, and interest payments to the savings account throughout the month. On another day, the customer may receive a checking-account statement summarizing similar information, and also including canceled checks for that month. On a separate day, the customer may receive a mortgage statement indicating the amount of the most recently received payment, how it was distributed among principal, interest, and escrow contributions. Later in the month, the customer may receive a credit-card statement summarizing payments received and purchases made during the month. Still other types of financial reporting information may be received depending on the number and type of accounts held by the customer with the financial institution. Moreover, each such distribution may include various types of inserts, advertising, etc.

The result of such multiple distributions is at least twofold. The customer is frustrated by receiving a relatively large volume of information, even though he was attracted to the financial institution by the simplicity of keeping multiple accounts with the same institution. In addition, the financial institution is subject to the additional expense associated with multiple distributions, including both internal costs of administering each distribution and external costs related to postage and the like.

There is accordingly a need in the art for methods and systems that permit consolidation of such information, particularly of financial reporting information.

BRIEF SUMMARY OF THE INVENTION

Embodiments of the invention thus provide methods and systems for providing financial reporting information to a customer that include consolidation of information for distinct financial accounts. While consolidation of such information is common to all the embodiments, there are different mechanisms by, and circumstances under, which the information is consolidated, as well as different ways in which the consolidated information is made available to the customer.

In one set of embodiments, for example, the method includes receiving financial reporting information for a plurality of distinct financial accounts at a host. The received financial reporting information is mapped onto a set of distinct financial account types. A consolidation of the mapped financial reporting information is determined according to a set of consolidation rules. The consolidated financial reporting information is then formatted according to a set of fulfillment rules for distribution to the customer.

In another set of embodiments, financial reporting information is received for a plurality of distinct financial accounts at a host, with at least two of the plurality of distinct financial accounts having different combinations of credit and debit mechanisms. A consolidation of the received financial reporting information is determined according to a set of consolidation rules. The consolidated financial reporting information is formatted according to a set of fulfillment rules for distribution to the customer.

In a further set of embodiments, financial reporting information is received for a plurality of distinct financial accounts at a host. A consolidation of the received financial reporting information is determined according to a set of consolidation rules, with at least a portion of the consolidation rules being defined by the customer. The consolidated financial reporting information is formatted according to a set of fulfillment rules for distribution to the customer.

In each of these sets of embodiments, various additional aspects may be included in the methods under appropriate circumstances. For example, each of the methods may further comprise preparing a summary of the consolidated financial reporting information for distribution to the customer with the consolidated financial reporting information. The consolidation rules may require consolidating a particular set of financial reporting information with any other available financial reporting information for the customer upon receipt of the particular set of financial reporting information. Alternatively, the consolidation rules may specify that a first set of financial reporting information is to be consolidated with a second set of financial reporting information only if the first and second sets are received less than a maximum period of time apart. Each of the methods may further comprise distributing the consolidated financial reporting information to the customer using electronic delivery methods, fax delivery methods, postal delivery methods, and/or voice delivery methods, among others. Each of the methods may further comprise preparing a summary report of the consolidated financial reporting information for transmission to a financial entity that maintains at least one of the plurality of distinct financial accounts. In some instances, at least two of the plurality of distinct financial accounts may be managed by different financial entities.

The methods of the present invention may be embodied in a computer-readable storage medium having a computer-readable program embodied therein for directing operation of the host system. The host system may include an input device, a communications system, a processor, and a storage device. The computer-readable program includes instructions for operating the host system to process a financial transaction in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention provide methods and systems for providing financial reporting information to a customer. These embodiments permit financial reporting information to be consolidated according to a set of consolidation rules and then to be formatted for distribution to the customer with a set of fulfillment rules. An overview of various embodiments is provided with the flow diagram shown in FIG. 1.

Figure 1:
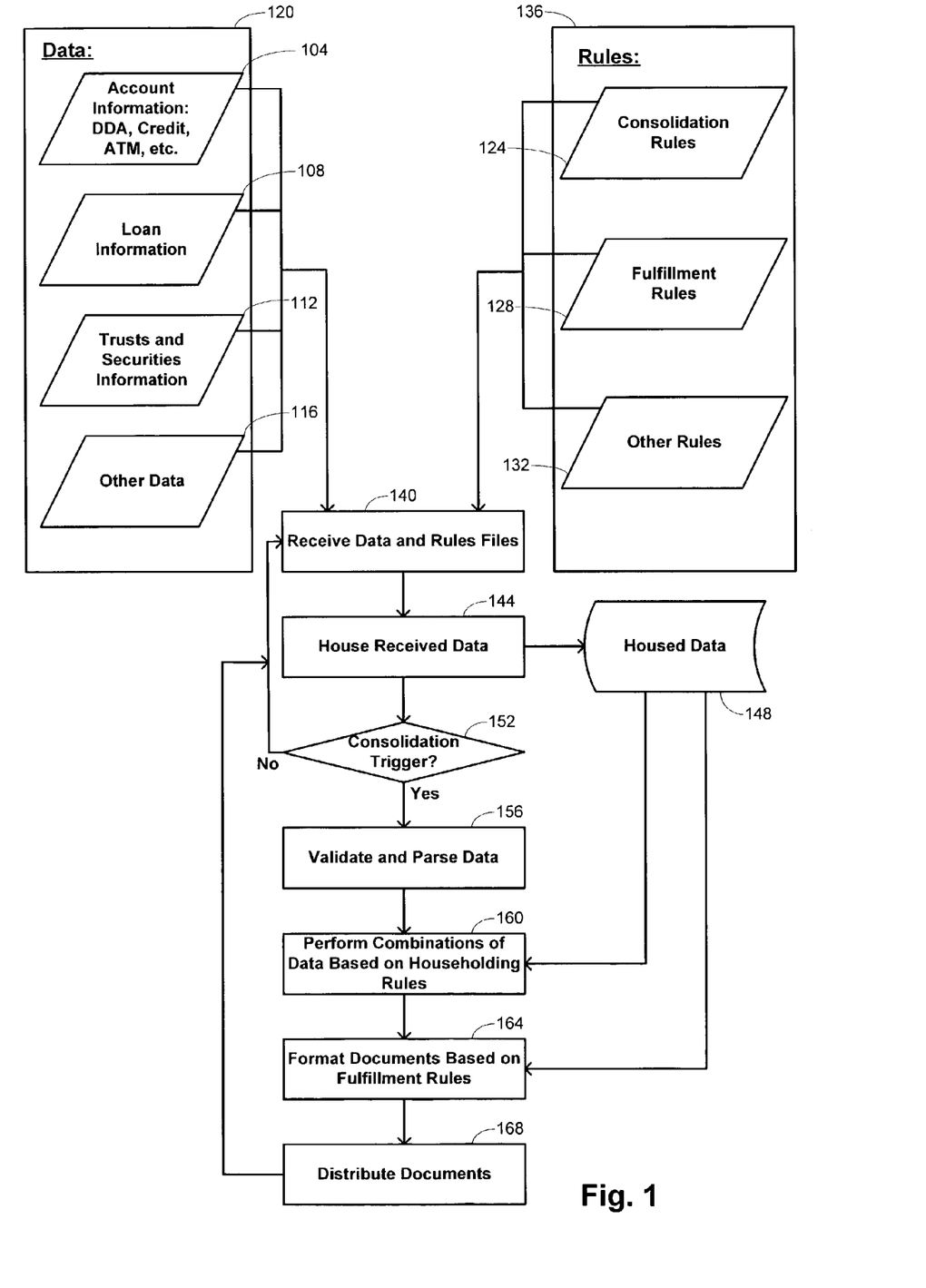
FIG. 1 is a flow diagram illustrating overall principles used in embodiments of the invention.

At block 140, data 120 and rules files 136 are received, such as by a host system described in greater detail below. The data 120 may include information for a variety of different types of financial accounts. As used herein, "types" of financial accounts are intended to be distinguished on the basis of their credit and debit mechanisms. To illustrate the how such credit and debit mechanisms may be used to define different financial-account types, a summary is provided of several exemplary financial accounts in Table I.

TABLE I

| Financial Account | Credit Mechanism | Debit Mechanism |
|---|---|---|
| Savings Account | Direct deposit to account | On-demand release of funds |
| Checking Account | Direct deposit to account | On-demand release of funds |
| Mortgage | Payment to account | Second mortgage |
| Credit Card | Payment to account | Limited by credit agreement |
| Mutual Fund | Purchase of shares | Sale of shares |
| Car Loan | Payment to account | Second loan |
| Home-equity Loan | Payment to account | Second loan |
| Certificate of Deposit | Fixed-amount purchase | Limited by Maturity Date |
| Trust Fund | Pursuant to trust agreement | Pursuant to trust agreement |

In the table, the "credit mechanism" refers to the means by which the balance owed to the customer is increased. In instances where funds are being held on behalf of the customer, such as in a savings or checking account, the balance owed to the customer is positive and crediting of the account results in a higher balance; conversely, in instances where funds have been extended to the customer on a credit basis, such as in connection with a car loan or mortgage, the balance owed to the customer is negative and crediting of the account results in a lower balance. The "debit mechanism" has the opposite meaning and refers to the means by which the balance owed to the customer is decreased. Thus, in instances where funds are being held on behalf of the customer, such as in a savings or checking account, the balance owed to the customer is positive and debiting of the account results in a lower balance; in instances where funds have been extended to the customer on a credit basis, such as in connection with a car loan or mortgage, the balance owed to the customer is negative and crediting of the account results in a higher balance.

As indicated in the table, a savings account and a checking account are considered to be the same type of financial account because they have the same credit and debit mechanisms. In both accounts, crediting the account is achieved by direct deposits of funds to the account and debiting the account is achieved through on-demand releases of funds, which may take the form of withdrawals, checks, etc. These accounts are sometimes referred to collectively herein as "demand deposit accounts." Loan accounts, such as a mortgage account, car-loan account, and home-equity-loan account are also considered to be the same type of account by virtue of their common credit and debit mechanisms. In these cases, the account balance reflects an amount required to be repaid by the customer, with credits to the account being performed by making payments to reduce the balance. Debiting the account is not generally possible directly, with an increase in the balance usually requiring that a second mortgage or loan be taken. The other financial accounts identified in the table represent further distinct types of financial accounts. The balance of a credit-card account, for example, represents the amount required to be repaid by the customer. Like other loan accounts, it may be credited, and the balance thereby reduced, by making payments to the account. It does not share the same debit mechanism, however, since the balance may be increased by making charges against the account; this is generally done in accordance with a credit agreement that specifies an account limit based on credit scores, credit history, and other relevant credit factors. A certificate-of-deposit account has a credit mechanism that is linked with the fixed amount of the initial purchase; generally, further funds cannot be credited to the same certificate of deposit. Debiting the account is restricted by a maturity date for the certificate of deposit, a restriction not present in the debit mechanisms of other types of financial accounts. A trust fund is an example of still another type of financial account, which may have credit and debit mechanisms specified by a trust agreement that differ from the other credit and debit mechanisms indicated in Table I.

The list of accounts and their credit/debit mechanisms in Table I is not intended to be exhaustive, but rather to illustrate the manner in which financial accounts may be classified according to their credit and debit mechanisms. Still other accounts may have other credit and debit mechanisms and thereby define other types of financial accounts. Block 120 of FIG. 1 thus represents sources of data that may be applicable to any relevant financial account, including information about the account itself at block 104, information about loan parameters used to govern the account at block 108, trusts and securities information at block 112, and any other data relevant to particular accounts as indicated generically at block 116.

The rules files may be classified into at least two distinct kinds of rules, including consolidation rules 124 and fulfillment rules 128. The consolidation rules 124 include rules that define how reporting information for different accounts is to be consolidated for distribution to the customer. This may include specification of which accounts are to be reported collectively, as well as provide time periods of how long to wait for reporting information from other accounts before formatting the reporting information for distribution to the customer. In different embodiments, the consolidation rules may be defined by a financial institution that controls one of the financial accounts whose reporting information is to be consolidated, may be defined by the customer, or may be defined by a combination of the financial institution and the customer. In some instances, a plurality of the financial accounts whose reporting information is to be consolidated may be controlled by different financial institutions. In such instances, and in instances where the consolidation rules include both financial-institution and customer-originated rules, the consolidation rules 124 may additionally include external rules for resolving inconsistencies. For example, such an external rule could be as simple as always giving priority to a customer-originated rule over a financial-institution-originated rule. It could always give priority to financial institution A's rules over those of financial institution B. In more complex circumstances, priority could be distributed among different rules according to the scope of those rules.

The fulfillment rules 128 define the actual formatting of the consolidated reporting information, including how the information is to be distributed to the customer and with what additional material. For example, the fulfillment rules 128 could define that certain consolidated information is to be sent by email, by fax, or by postal service, and that certain advertising inserts should be included under certain circumstances. In some instances, the rules 136 may include still other rules 132 to be applied by the system in addition to the consolidation and fulfillment rules 124 and 128.

After the data 120 and rules 136 are received at block 140, at least some of the received data may be housed at block 148 in accordance with block 144. This housed data 148 is held pending satisfaction at block 152 of a consolidation trigger, which may be included in the received consolidation rules. For example, consider the case where reporting information for a mortgage account is to be consolidated with reporting information for a demand deposit account. The reporting information for the mortgage account may be received before the reporting information for the demand deposit account. The mortgage-account information is therefore housed, awaiting satisfaction of the consolidation trigger, which may specify that either both mortgage-account and demand-deposit-account information have been received or that five business days have passed after receipt of one without receipt of the other. Thus, the system will wait for the further receipt of reporting information for the demand deposit account, proceeding further as soon as it is received, but not waiting more than five days.

After the consolidation trigger has been satisfied, the relevant data are validated and parsed at block 156. The consolidation rules are further applied from the housed data 148 at block 160 to perform the combinations of data needed to effect the consolidation. The fulfillment rules are then applied from the housed data 148 at block 164 to format documents for distribution to the customer at block 168. The method thus repeats, collecting data at block 140 and performing the consolidation for new data 120 as they become available in accordance with the rules 136.

Figure 2:
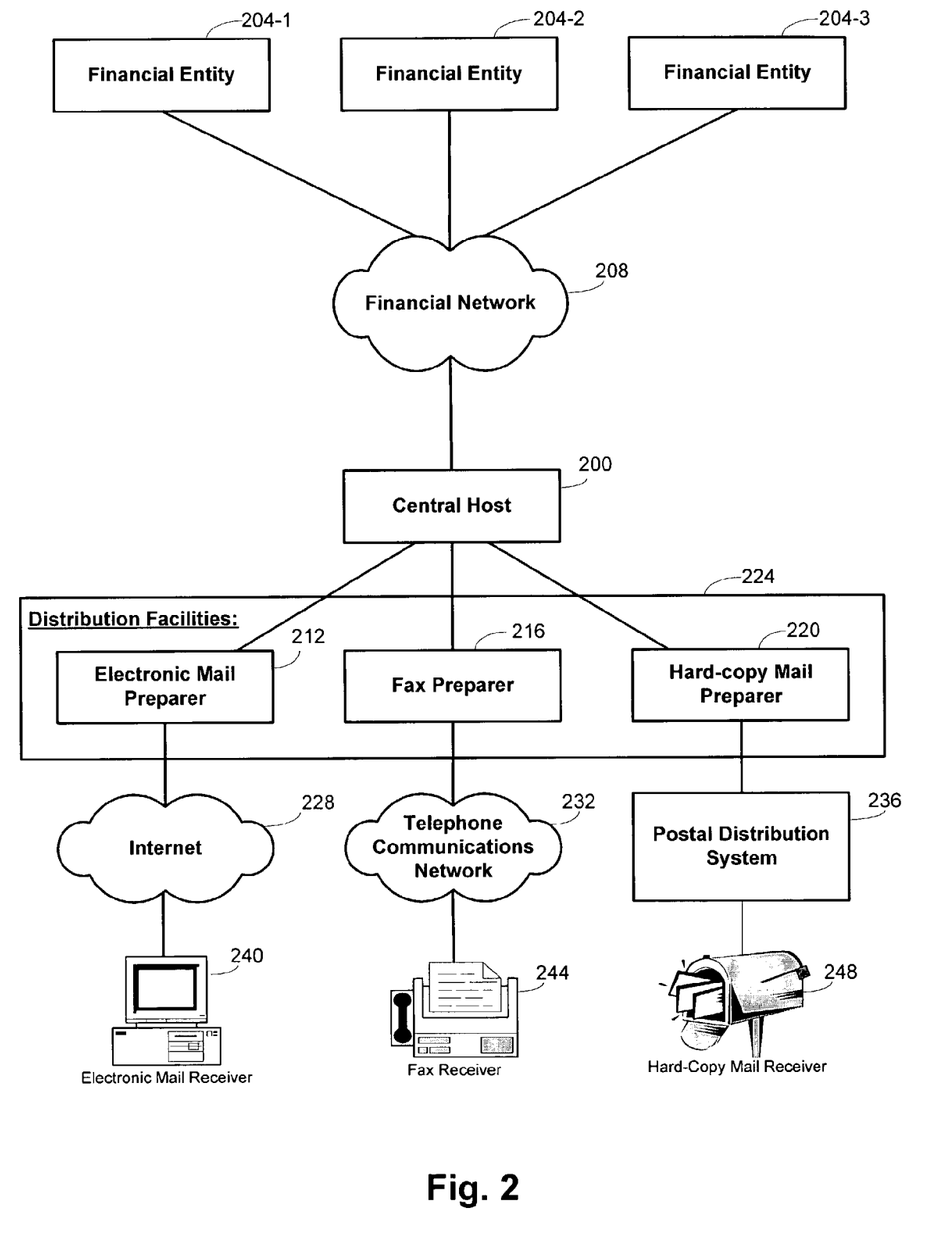
FIG. 2 is a schematic block-diagram representation of an architecture for providing financial reporting information in accordance with an embodiment of the invention.
Figure 3:
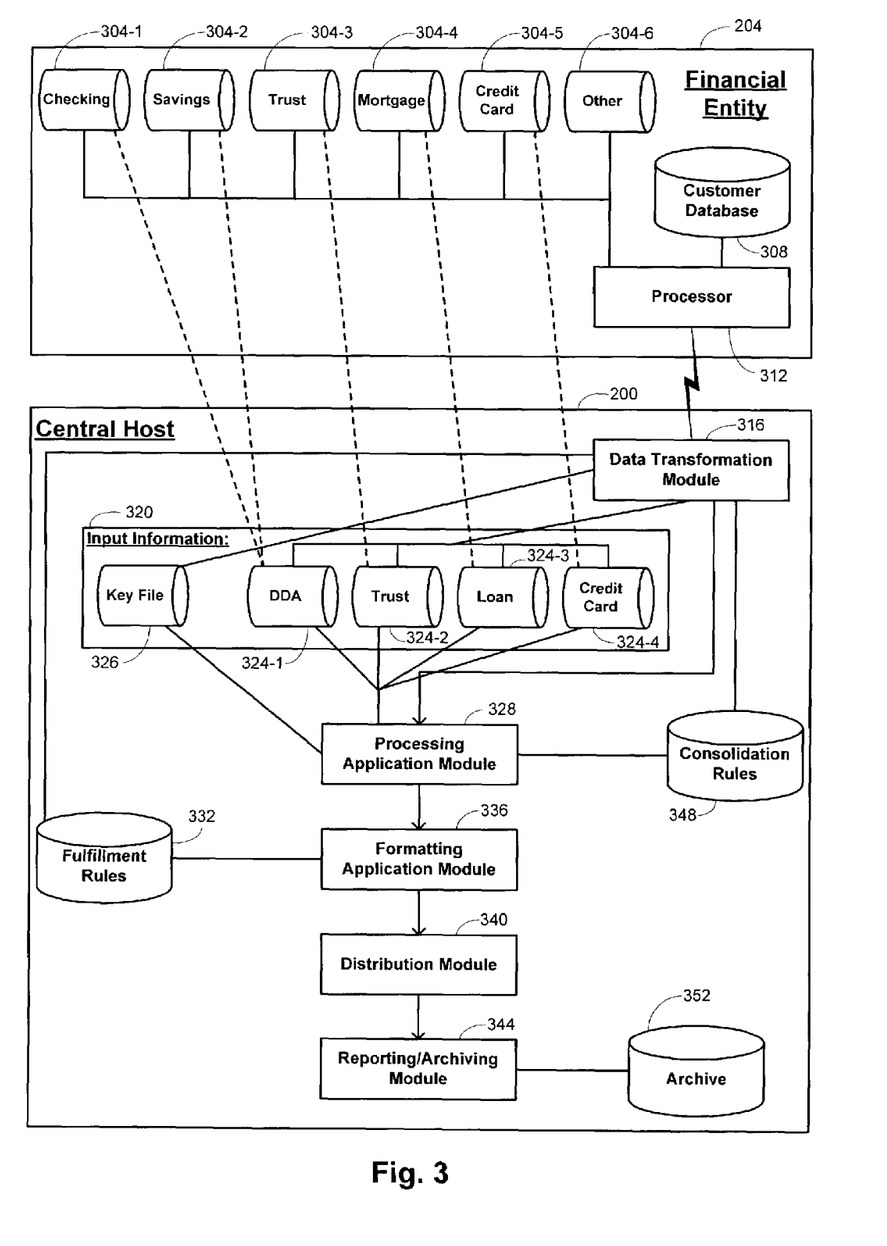
FIG. 3 provides a schematic illustration of modules used in implementing embodiments of the invention.

The application of the method may be understood in greater detail with reference to FIGS. 2 and 3. FIG. 2 illustrates a portion of an architecture into which a central host 200 configured to implement the method may be integrated and FIG. 3 provides a more detailed illustration of a configuration of the central host. The data and/or rules received by the central host 200 may originate with one or more financial entities 204 and be transmitted to the central host 200 through a financial network 208. The financial entities 204 may comprise such entities as banks, credit unions, trust-management companies, mutual fund companies, discount brokerage firms, and the like. By permitting communication with the financial entities 204 through the financial network 208, the central host 200 may perform functions on behalf of a plurality of financial entities 204 or may perform functions that consolidate information from multiple financial entities 204. Embodiments that permit consolidation among multiple financial entities 204 may be suitable, for example, in instances where a customer wishes to have demand-deposit-account and mutual-fund reporting information consolidated even though her demand deposit accounts and mutual funds are held at different institutions.

The central host 200 is configured with communications protocols that permit interaction with a variety of different distribution facilities 224 depending on how the reporting information is to be distributed to the customer. For example, if the fulfillment rules 128 for a particular distribution require that the reporting information be distributed electronically, an electronic-mail preparer 212 may be used. Such an electronic-mail preparer 212 is configured to format the reporting information so that it is suitable for electronic communication. Actual distribution to the customer may be achieved by using the Internet 228 so that the formatted reporting information may be retrieved using a device 240 connected to the Internet, such as a PC, PDA, and the like. In some instances, the formatted reporting information may be sent directly to an email account of the customer, while in other instances, it will be made accessible to the customer on an Internet web site, perhaps with a notification sent to the customer's email account as a reminder that it has been posted.

Similarly, if the fulfillment rules 128 require that a particular distribution be made by fax, a fax preparer 216 may be used to format the reporting information for faxing over the telephone communications network 232 to the customer's fax receiver 244. The fax receiver 244 may comprise a dedicated fax machine or may comprise another device with the capacity for receiving faxes, such as a PC. If the fulfillment rules 128 require that a particular distribution be made by post, a hard-copy mail preparer 220 may be used to generate and prepare a paper copy for delivery to the postal distribution system 236 and receipt at the customer's hard-copy mail receiver 248. Each of the distribution facilities 224 includes the capability of adding additional material to the consolidated reporting information, such as in the form of inserts and the like. In some cases, this additional material may be included globally for reporting information distributed to all customers, but in other cases the additional material may be included selectively for each customer. Methods and systems for selective collation of materials for distribution to customers is described in detail in copending, commonly assigned U.S. patent application Ser. No. 10/028,449, entitled "REAL-TIME INTELLIGENT PACKET COLLATION SYSTEMS AND METHODS," filed Dec. 19, 2001 by Scott J. Smith et al., the entire disclosure of which is herein incorporated by reference for all purposes. Those methods and systems may be comprised by the distribution facilities 224 in some embodiments to perform selective collation of materials with consolidated reporting information.

The identification of certain types of distribution facilities 224 in FIG. 2 is intended only to be for purposes of illustration and is not intended to be exhaustive. Alternative distribution methods may be used, including distributions by voice and other methods known to those of skill in the art. Furthermore, the distribution facilities 244 may include language-translation capabilities so that the distribution may be in any desired language, including languages readable by the blind, such as Braille.

FIG. 3 provides a detailed schematic illustration of functional components of an exemplary financial entity 204 and the central host 200 to illustrate the interaction between them and the processing of data. Communication of data from the financial entity 204 to the central host 200 is coordinated by a processor 312, which is provided with access to a variety of data stores 304. These data stores comprise information related to the administration of various types of financial accounts managed by the financial entity 204. In the illustration, the financial entity manages at least checking, savings, trust, mortgage, and credit-card accounts. In addition, the processor 312 is provided with access to a customer database 308 that includes information relating to customer preferences.

When data are received by the central host 200 at block 140 of FIG. 1, the data may be received from the processor 312 by a data transformation module 316 comprised by the central host 200. The data transformation module 316 may be used to verify that the received data meets certain formal constraints in terms of file layout and formats to ensure that it may be interpreted properly. In addition, the data transformation module may perform a mapping of the received financial reporting information onto a set of distinct financial-account types 324. This mapping may account for differences in the way in which financial accounts are organized at different financial entities 204 and at the central host 200. For example, the central host 200 includes data stores 324 that correspond to demand deposit accounts, trusts, loans, and credit cards. The dashed lines between the data stores 304 maintained by the financial entity 204 and the data stores 324 maintained by the host system 200 illustrate the way in which such a mapping may be performed. In the illustration, for example, the checking and savings account data stores 304-1 and 304-2 are mapped to the demand deposit account data store 324-1 since they share the same credit and debit mechanisms; the mortgage data store 304-4 is similarly mapped to the loan data store 324-3 because the credit and debit mechanisms correspond. Other financial entities may have other data stores, such as home-equity-loan and car-loan data stores that may also be mapped by the data transformation module 316 where their respective data are received.

The data transformation module 316 may also format data for a key file 326 that summarizes information for each account and how it is to be processed by the central host 200. For example, the key file 326 may include an assigned key number for each account, with a respective account number, cycle date, timeliness rule, and combination rules, among other parameters. In formatting data for the key file, the data transformation module 316 may draw on information concerning the financial entity's data stores 304, the customer database 308, the consolidation rules 348 and the fulfillment rules 332. Collectively, the data stores 324 and key file 326 thus define input information that may then be used by a sequence of application modules to produce consolidated information for distribution to the customer.

The operation of the data transformation module 316 in generating the key file upon receipt of data may be illustrated with some examples, the details of which are not intended to be limiting.

EXAMPLE 1

The consolidation rules for the mortgage account reporting information of Bank A require that that information be held for five days in anticipation of other information. The consolidation rules for the credit-card account information require immediate combination with any other available data. If the mortgage account reporting information is received by the data transformation module on January 2 and the credit-card account information is received on January 4, the mortgage and credit-card account information will be immediately consolidated on January 4. This is a consequence of the information stored in the key file, which identifies that the credit-card information has an order that it be combined immediately.

EXAMPLE 2

The consolidation rules for the mortgage and credit-card account information are the same as in Example 1, but the customer database includes a preference for Mr. Smith that mortgage account reporting information be transmitted as soon as possible. The consolidation rules include a provision giving priority to all customer preferences. In this instance, the information in the key file results in immediate distribution of the mortgage account information on January 2 and of the credit-card account information on January 4.

EXAMPLE 3

The consolidation rules according to Bank A are the same as in Example 1. Consolidation rules for Mutual Fund Company B require waiting for distribution of mortgage account information, at which time it is to be consolidated with mutual-fund reporting information. An agreement between A and B permit consolidation of information for customers common to the two. If Mutual Fund Company B sends its report of the status of the customer's mutual funds on December 31, the key file will wait until January 4 to combine the mutual-fund, mortgage, and credit-card account information. The combination January 4 date is used since the consolidation trigger is distribution of the mortgage account information. If the consolidation trigger were receipt of mortgage account information by the central host, consolidation would instead occur on January 2. The consolidation rules of A and B may thus be reconciled.

EXAMPLE 4

In some cases, the consolidation rules of A and B may be in conflict, such as when Mutual Fund Company B instead requires immediate distribution of mutual-fund account information upon its receipt by the central host with any available mortgage-account information. If the mutual-fund account information is transmitted by B on January 3, generation of the appropriate key-file entry may depend on priority rules comprised by the consolidation rules. If the rules of A are given priority, distribution of combined mutual-fund, mortgage, and credit-card account information will occur on January 4 since A's requirement to wait up to five days for credit-card account information governs. If the rules of B are given priority, distribution of combined mutual-fund and mortgage account information will occur on January 3 in accordance with B's requirement of immediate distribution, and credit-card account information will be distributed on January 4 in accordance with the nonconflicting portion of A's consolidation rules.

Upon initiation of consolidation by the key file 326, a processing application module 328 extracts the data required to perform the consolidation from the relevant data stores 324. The processing application module 328 then uses the consolidation rules to perform the consolidation of information. Such consolidation processes may implement a predetermined setup based on the output type and file format for that output type. For example, the consolidation processes may include determining how to blend section or pages within the file output and/or for starting new sections or pages. In some instances, consolidation may also include creating a summary page that summarizes the reporting information for each of the different financial accounts. The summary page may then be included with the consolidated information when it is distributed.

The consolidated data are then formatted with a formatting application module 336 to produce a consolidated document. The formatting application module 336 may implement such processes as address cleansing, page management, weight management, white-space management, messaging, document composition, and the like. Address cleansing is a process that ensures the validity of addresses by comparing addresses received from the data stores 304 with a standardized set of addresses. Such standardized sets are generally provided by government postal-service suppliers and software for performing the cleansing is available from commercial suppliers. One example of a commercially available product that performs address cleansing is the Pitney Bowes Finalist® product, which corrects street directions, street and city spellings, U.S. state abbreviations, ZIP codes, and carrier route codes, and modifies addresses to conform to U.S. Postal Service standards for more reliable delivery. Page and weight management functions may be used to prioritize insert and advertising information, in some instances in accordance with the weight of specific items to optimize the total weight of a package according to applicable postal rates. As previously noted, the actual assembly of a package according to the desired insert and advertising information may be performed as described in U.S. patent application Ser. No. 10/028,449, which has been incorporated by reference. The white-space management process provides functionality that allows space usage on a document page to be optimized, such as by including optional items to fill blank space when consistent with the fulfillment rules 332. The messaging process permits individualized messages to be placed on a document. The document composition process comprises a control process that coordinates these various other process to build the document.

The particular use of specific processes by the formatting application module 336 may depend on the method of distribution to be used. For example, if the consolidated document is to be distributed with a postal service, the formatting application module may use all of the process to produce the consolidated document. If the consolidated document is to be distributed by electronic mail or by fax, execution of the address cleansing and weight-management processes may be omitted.

Once the reporting information has been formatted into a consolidated document, it is distributed by the distribution module 340. The distribution module 340 may use any desired output format to distribute the document to a variety of endpoints, such as by using any of the various distribution facilities 224 discussed in connection with FIG. 2.

The central host 200 may also comprise a reporting/archiving module 344 configured for performing reporting and/or archiving functions. The reporting/archiving module 344 may perform reporting functions by transmitting a copy of each consolidated document back to the financial entity 204 or by transmitting a summary of the information communicated to customers back to the financial entity 204. The archiving functions may be performed by storing records of the information communicated to customers in an archive data store 352. Access to the archive data store 352 may then be provided to the financial entity 204 over a secure network mechanism, such as with an Internet interface. The interface may include a variety of query tools for use by the financial entity 204. For example, the interface may permit the financial entity 204 to retrieve and reprint specific consolidated documents, which may be useful in resolving disputes with customers or in the context of other customer relations. The interface may also provide summarization tools that permit the financial entity 204 to create summaries of the archived data according to specified parameters. Such summaries may be of use to the financial entity 204 in changing reporting schedules or other operational protocols to improve interaction with customers. In some instances, portions of the archived data for specific customers may be accessible by those customers directly.

In some embodiments, the queriable archive data store 352 may be comprised by a collection of queriable data stores that represent data collected from a plurality of distinct sources of financial-transaction data. This collection of data stores may thus be considered to define a queriable database that may be maintained and administered as described in copending, commonly assigned U.S. patent application Ser. No. 10/193,722, entitled "METHODS AND SYSTEMS FOR ORGANIZING INFORMATION FROM MULTIPLE SOURCES," filed Jul. 10, 2002 by Brian Friedman, the entire disclosure of which is herein incorporated by reference for all purposes.

Figure 4:
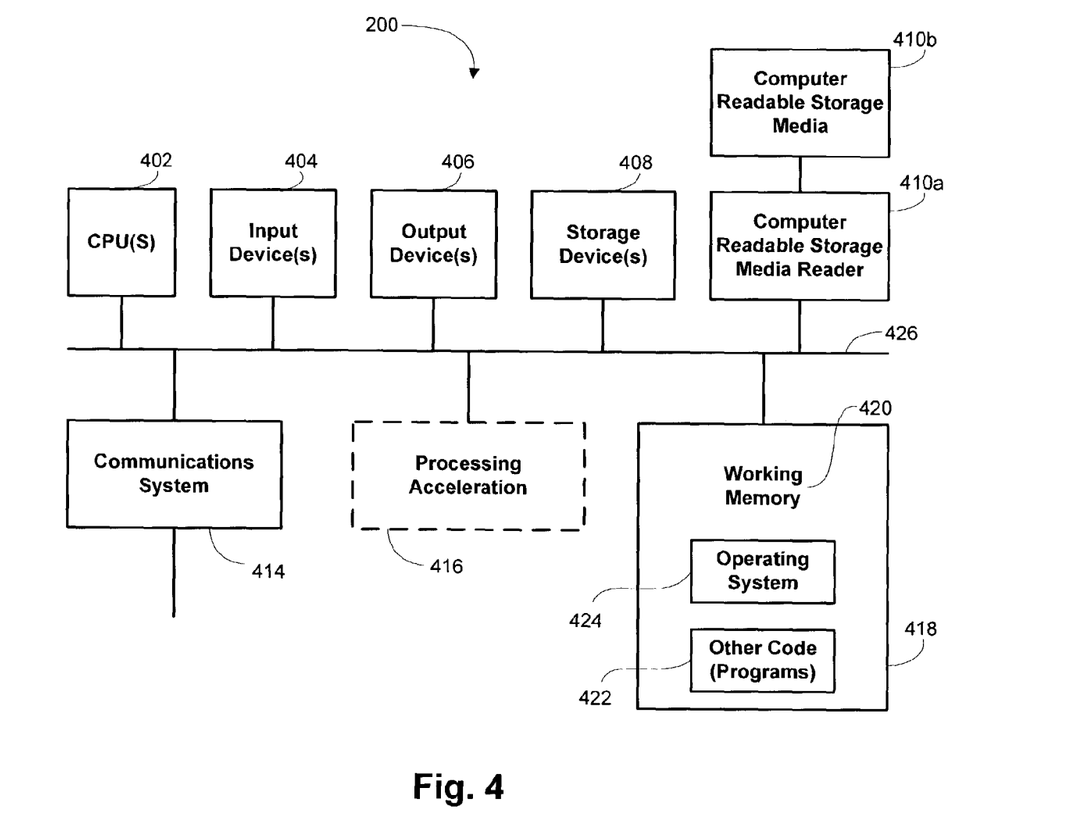
FIG. 4 is a schematic illustration of a computer system on which methods of the invention may be embodied.

FIG. 4 provides a schematic illustration of a hardware structure that may be used to implement the host system 200. FIG. 4 broadly illustrates how individual system elements may be implemented in a separated or more integrated manner. The host system 200 is shown comprised of hardware elements that are electrically coupled via bus 426, including a processor 402, an input device 404, an output device 406, a storage device 408, a computer-readable storage media reader 410*a*, a communications system 414, a processing acceleration unit 416 such as a DSP or special-purpose processor, and a memory 418. The computer-readable storage media reader 410*a* is further connected to a computer-readable storage medium 410*b*, the combination comprehensively representing remote, local, fixed, and/or removable storage devices plus storage media for temporarily and/or more permanently containing computer-readable information. The communications system 414 may comprise a wired, wireless, modem, and/or other type of interfacing connection and permits data to be exchanged with the financial entities 204 and distribution facilities 224 to implement embodiments as described above.

The host system 200 also comprises software elements, shown as being currently located within working memory 420, including an operating system 424 and other code 422, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

The correspondence between the functional illustration of the central host 200 in FIG. 3 and the hardware illustration in FIG. 4 may be understood as follows. The data stores 324, key file 326, consolidation rules 348, and fulfillment rules 332 are stored in the storage devices 408. Software to define the operation of the data transformation module 316, processing application module 328, formatting application module 336, distribution module 340, and reporting module 344 is included in the memory 418 and implemented by the processors 402.

Figure 5:
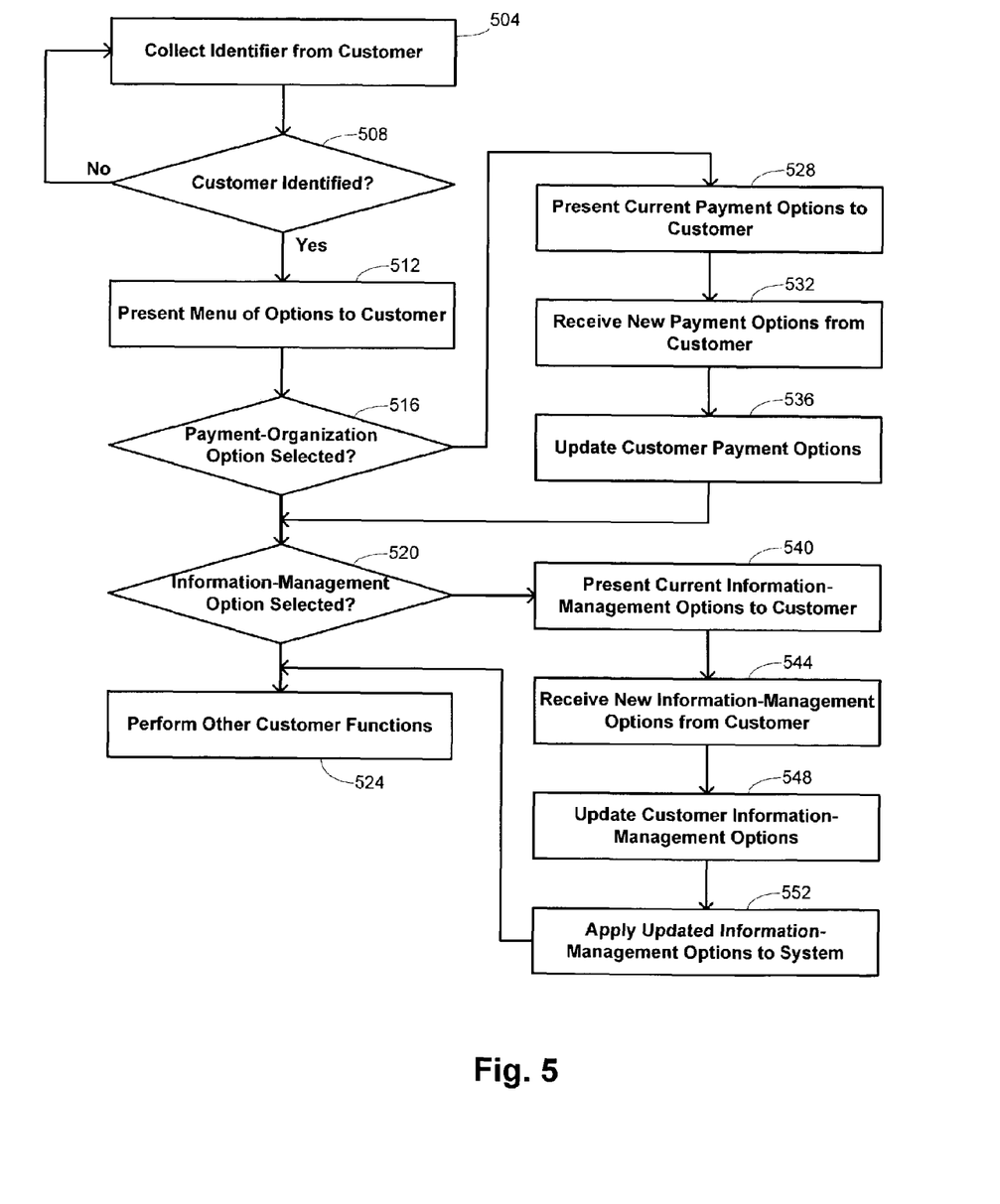
FIG. 5 is a flow diagram illustrating a method for reporting financial information to a customer in accordance with an embodiment of the invention.

In some instances, customer service may be enhanced with a customer interface to permit specification of customer preferences to the customer database 308. In some embodiments, this customer interaction may be integrated with a system for providing a customer with the ability to specify and change payment options associated with one or more of the financial accounts, as described in the following copending, commonly assigned applications, both of which are herein incorporated by reference for all purposes: U.S. patent application Ser. No. 10/168,871, entitled "METHOD AND APPARATUS FOR MAPPING SOURCES AND USES OF CONSUMER FUNDS," filed Jun. 24, 2002 by Craig Compiano and U.S. patent application Ser. No. 10/336,671, entitled "METHOD AND APPARATUS FOR MAPPING SOURCES AND USES OF CONSUMER FUNDS," filed Jan. 2, 2003 by Craig Compiano. FIG. 5 illustrates the interaction with the customer in such an integrated embodiment. This interaction may proceed through any suitable interaction mechanism, including through the internet, though a DTMF interface, and the like.

At block 504, an identifier is collected from the customer to authenticate the customer's identity, such as by requiring entry of a password for comparison with a password file. If the customer is properly identified at block, a menu of options is presented at block 512. The menu may be presented visually, such as by displaying it on a display device for the customer, or may be presented aurally, such as by presenting it with a prerecorded voice system. If the customer selects the payment-organization option at block 516, the system permits the customer to review and change a variety of payment options associated with one or more of the financial accounts. The payment options may include such factors as when a recurring payment is to be made, where the funds to support the recurring payment are to be obtained, how large the payment is to be, and the like. The current payment options are presented to the customer at block 528. After the options have been reviewed by the customer, they may be changed by the customer inputting new options into fields populated for that purpose. The system receives the new payment options at block 532 and updates them in the customer database 308 at block 536.

If the customer selects the information-management option selection at block 520, the system permits the customer to review and change various information-management options associated with the plurality of financial accounts. Such options dictate the customer's preferences in connection with which types of financial reporting information the customer wishes to receive and how it is to be consolidated. Thus, the current information-management options, which specify how the customer currently prefers such financial reporting information to be consolidated and distributed, are presented at block 540. After the options have been reviewed by the customer and, if desired, changed by inputting new options into fields populated for that purpose, the system obtains the new information-management options at block 544. The system updates the customer-information management options in accordance with the new options at block 552 and applies the updated options at block 552.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for providing financial reporting information to a customer, the method comprising:
receiving financial reporting information for a plurality of distinct financial accounts at a host system;
mapping the received financial reporting information onto a set of distinct financial account types with the host computer system wherein each financial account type of the set of financial account types is distinguished based on a credit mechanism by which an account balance is increased and a debit mechanism by which the account balance is decreased;
consolidating the mapped financial reporting information according to a set of consolidation rules with the host computer system wherein the consolidation rules are defined by both the financial institution that controls at least one of the financial accounts and the customer;
formatting the consolidated financial reporting information according to a set of fulfillment rules with the host computer system for distribution to the customer; and
preparing a summary of the consolidated financial reporting information for distribution to the customer with the consolidated financial reporting information.

2. The method recited in claim 1 wherein the consolidation rules require consolidating a particular set of financial reporting information with any other available financial reporting information for the customer upon receipt of the particular set of financial reporting information.

3. The method recited in claim 1 wherein the consolidation rules specify that a first set of financial reporting information is to be consolidated with a second set of financial reporting information only if the first and second sets are received less than a maximum period of time apart.

4. The method recited in claim 1 further comprising distributing the consolidated financial reporting information to the customer with a delivery method selected from the group consisting of electronic delivery, fax delivery, postal delivery, and voice delivery based on the fulfillment rules.

5. The method recited in claim 1 further comprising preparing a summary report of the consolidated financial reporting information for transmission to a financial entity that maintains at least one of the plurality of distinct financial accounts.

6. The method recited in claim 1 wherein at least two of the plurality of distinct financial accounts are managed by different financial entities.

7. A method for providing financial reporting information to a customer, the method comprising:
receiving financial reporting information for a plurality of distinct financial accounts at a host computer system, wherein each of the distinct financial accounts is one of a set of account types, each financial account type of the set of financial account types distinguished based on a credit mechanism by which an account balance is increased and a debit mechanism by which the account balanced is decreased and at least two of the plurality of distinct financial accounts are of different account types;

consolidating the received financial reporting information according to a set of consolidation rules with the host computer system based on the account type of each financial account wherein the consolidation rules are defined by both the financial institution that controls at least one of the financial accounts and the customer;

formatting the consolidated financial reporting information according to a set of fulfillment rules with the host computer system for distribution to the customer; and preparing a summary of the consolidated financial reporting information for distribution to the customer with the consolidated financial reporting information.

8. The method of claim 1, further comprising resolving inconsistencies between the consolidation rules defined by the financial institution that controls at least one of the financial accounts and consolidation rules defined by the customer based on a set of external rules.

9. The method of claim 8, wherein resolving inconsistencies between the consolidation rules defined by the financial institution that controls at least one of the financial accounts and consolidation rules defined by the customer based on a set of external rules comprises giving priority to consolidation rules defined by the financial institution.

10. The method of claim 8, wherein resolving inconsistencies between the consolidation rules defined by the financial institution that controls at least one of the financial accounts and consolidation rules defined by the customer based on a set of external rules comprises giving priority to consolidation rules defined by the customer.

11. The method recited in claim 7 wherein the consolidation rules require consolidating a particular set of financial reporting information with any other available financial reporting information for the customer upon receipt of the particular set of financial reporting information.

12. The method recited in claim 7 wherein the consolidation rules specify that a first set of financial reporting information is to be consolidated with a second set of financial reporting information only if the first and second sets are received less than a maximum period of time apart.

13. The method recited in claim 7 further comprising distributing the consolidated financial reporting information to the customer with a delivery method selected from the group consisting of electronic delivery, fax delivery, postal delivery, and voice delivery based on the fulfillment rules.

14. The method recited in claim 7 further comprising preparing a summary report of the consolidated financial reporting information for transmission to a financial entity that maintains at least one of the plurality of distinct financial accounts.

15. The method recited in claim 7 wherein at least two of the plurality of distinct financial accounts are managed by different financial entities.

16. A computer-readable storage medium having a computer-readable program embodied therein for directing operation of a host system including an input device, a communications system, a processor, and a storage device, wherein the computer-readable program includes instructions for operating the host system to process a financial transaction in accordance with the following:

receiving financial reporting information for a plurality of distinct financial accounts with the communications system;

mapping the received financial reporting information onto a set of distinct financial account types with the processor wherein each financial account type of the set of financial account types is distinguished based on a credit mechanism by which an account balance is increased and a debit mechanism by which the account balance is decreased;

consolidating the mapped financial reporting information with the processor according to a set of consolidation rules maintained on the storage device wherein the consolidation rules are defined by both the financial institution that controls at least one of the financial accounts and the customer;

formatting the consolidated financial reporting information with the processor according to a set of fulfillment rules maintained on the storage device for distribution to the customer; and preparing with the processor a summary of the consolidated financial reporting information for distribution to the customer with the consolidated financial reporting information.

17. The computer-readable storage medium recited in claim 16 wherein the consolidation rules require consolidating a particular set of financial reporting information with any other available financial reporting information for the customer upon receipt of the particular set of financial reporting information.

18. The computer-readable storage medium recited in claim 16 wherein the consolidation rules specify that a first set of financial reporting information is to be consolidated with a second set of financial reporting information only if the first and second sets are received less than a maximum period of time apart.

19. The computer-readable storage medium recited in claim 16 wherein the computer-readable program further includes instructions for distributing the consolidated financial reporting information to the customer with a delivery method selected from the group consisting of electronic delivery, fax delivery, postal delivery, and voice delivery based on the fulfillment rules.

20. A computer-readable storage medium having a computer-readable program embodied therein for directing operation of a host system including an input device, a communications system, a processor, and a storage device, wherein the computer-readable program includes instructions for operating the host system to process a financial transaction in accordance with the following:

receiving financial reporting information for a plurality of distinct financial accounts with the communications system, wherein each of the distinct financial accounts is of one of a set of account types, each financial account type of the set of financial account types distinguished based on a credit mechanism by which an account balance is increased and a debit mechanism by which the account balanced is decreased and at least two of the plurality of distinct financial accounts are of different account types;

consolidating the received financial reporting information with the processor according to a set of consolidation rules maintained on the storage device based on the account type of each financial account wherein the consolidation rules are defined by both the financial institution that controls at least one of the financial accounts and the customer;

formatting the consolidated financial reporting information with the processor according to a set of fulfillment rules maintained on the storage device for distribution to the customer; and preparing with the processor a summary of the consolidated financial reporting information for distribution to the customer with the consolidated financial reporting information.

21. The computer-readable storage medium recited in claim 20 wherein the consolidation rules require consolidating a particular set of financial reporting information with any other available financial reporting information for the customer upon receipt of the particular set of financial reporting information.

22. The computer-readable storage medium recited in claim 20 wherein the consolidation rules specify that a first set of financial reporting information is to be consolidated with a second set of financial reporting information only if the first and second sets are received less than a maximum period of time apart.

23. The computer-readable storage medium recited in claim 20 wherein the computer-readable program further includes instructions for distributing the consolidated financial reporting information to the customer with a delivery method selected from the group consisting of electronic delivery, fax delivery, postal delivery, and voice delivery based on the fulfillment rules.

* * * * *